(12) United States Patent
Tsutsui et al.

(10) Patent No.: US 12,157,021 B2
(45) Date of Patent: Dec. 3, 2024

(54) SELF-EXTINGUISHING, TOXIC GASES CONTAINMENT ENCLOSURE FOR LITHIUM-ION BATTERIES

(71) Applicant: Purdue Research Foundation, West Lafayette, IN (US)

(72) Inventors: Waterloo Tsutsui, West Lafayette, IN (US); Esteban E. Marinero-Caceres, West Lafayette, IN (US); Weinong Wayne Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 529 days.

(21) Appl. No.: 17/337,322

(22) Filed: Jun. 2, 2021

(65) Prior Publication Data

US 2021/0379428 A1    Dec. 9, 2021

Related U.S. Application Data

(60) Provisional application No. 63/034,942, filed on Jun. 4, 2020.

(51) Int. Cl.
*A62C 2/24* (2006.01)
*A62C 3/16* (2006.01)
*A62C 99/00* (2010.01)
*H01M 10/48* (2006.01)
*H01M 50/14* (2021.01)

(52) U.S. Cl.
CPC ............... *A62C 2/247* (2013.01); *A62C 3/16* (2013.01); *A62C 99/0018* (2013.01); *H01M 10/486* (2013.01); *H01M 50/14* (2021.01)

(58) Field of Classification Search
CPC .. A62C 3/07; A62C 3/16; A62C 13/76; A62C 35/13; A62C 37/38; A62C 99/0018; A62C 2/247; A62C 35/10; A62C 3/002
See application file for complete search history.

(56) References Cited

U.S. PATENT DOCUMENTS 8,945,740 B2    2/2015  Fuhr et al.
9,958,243 B2    5/2018  Motyka et al.
(Continued)

FOREIGN PATENT DOCUMENTS

KR    20200061814    *    6/2020    ............. A62C 35/10

OTHER PUBLICATIONS

D. K. Bwambok et al., "Adaptive Use of Bubble Wrap for Storing Liquid Samples and Performing Analytical Assays," Anal. Chem., vol. 86, No. 15, pp. 7478-7485, Jul. 2014.
(Continued)

*Primary Examiner* — Christopher R Dandridge
(74) *Attorney, Agent, or Firm* — Purdue Research Foundation

(57) ABSTRACT

An enclosure for safe transportation and storage of a battery or a collection of batteries. The enclosure contains a plurality of batteries held together by a polymer structure, wherein the polymer structure contains s pockets capable of encapsulating at least one fire extinguishing fluid. Sensors deployed on a surface of each battery in the plurality of batteries are capable of monitoring surface temperature and volume expansion of each battery in the enclosure and providing signal output. The enclosure also contains a toxic gas release management and containment system.

12 Claims, 6 Drawing Sheets

(56) References Cited

U.S. PATENT DOCUMENTS

2014/0272498 A1* 9/2014 Duncan ................ H01M 10/48
                                                                             429/90
2018/0327165 A1* 11/2018 Lee, Sr. .................... F25D 3/06

OTHER PUBLICATIONS

A. Nedjalkov et al., "Toxic Gas Emissions from Damaged Lithium Ion Batteries—Analysis and Safety Enhancement Solution," Batteries, vol. 2, No. 1, p. 5, Mar. 2016.
T. Yim et al., "Self-Extinguishing Lithium Ion Batteries Based on Internally Embedded Fire-Extinguishing Microcapsules with Temperature-Responsiveness," Nano Lett., vol. 15, No. 8, pp. 5059-5067, Jul. 2015.

* cited by examiner

SELF-EXTINGUISHING, TOXIC GASES CONTAINMENT ENCLOSURE FOR LITHIUM-ION BATTERIES

CROSS-REFERENCE TO RELATED APPLICATIONS

The present U.S. patent application is related to and claims the priority benefit of U.S. Provisional Patent Application Ser. No. 63/034,942, filed Jun. 4, 2020, the contents of which are hereby incorporated by reference in their entirety into the present disclosure.

TECHNICAL FIELD

This disclosure generally relates battery enclosures designed for the safe transportation of lithium-ion batteries that allow mitigation during battery transportation of potential safety hazards associated with a thermal runaway event in lithium-ion batteries, including the hazards of battery combustion and the emission of toxic gases.

BACKGROUND

This section introduces aspects that may help facilitate a better understanding of the disclosure. Accordingly, these statements are to be read in this light and are not to be understood as admissions about what is or is not prior art.

Lithium-ion batteries are the batteries of choice for transportation and portable devices on account of their high energy density. However, the liquid electrolytes utilized are flammable, and the formation of dendrites resulting from charge/discharge operations can short circuit the electrode materials leading to catastrophic failure. Furthermore, the generation of heat in the charge/discharge operations results in thermal runaway events whereby the increase in temperature accelerates the formation of gas which in turn increase the internal pressure resulting in gas venting and fire. Shock and projectile piercing of a lithium-ion battery can also result in catastrophic fires and explosions.

Thus, there is an unmet need for an enclosure for the safe transportation of lithium-ion batteries that allows mitigation during battery transportation of potential safety hazards associated with a thermal runaway event in lithium-ion batteries. These hazards include battery combustion and the emission of toxic gases. There is an unmet need for an enclosure that benefits both the military and commercial markets requiring safe transport of high energy density, albeit flammable and explosive, lithium-ion batteries.

SUMMARY

An enclosure for safe transportation and storage of a battery or a collection of batteries. The enclosure contains a plurality of batteries held together by a polymer structure, wherein the polymer structure contains s pockets capable of encapsulating at least one fire extinguishing fluid. Sensors deployed on a surface of each battery in the plurality of batteries are capable of monitoring surface temperature and volume expansion of each battery in the enclosure and providing signal output. The enclosure also contains a toxic gas release management and containment system.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example and not to be construed as limiting. Further, in this disclosure, the figures shown for illustrative purposes are not to scale, and those skilled in the art can readily recognize the relative dimensions of the different segments of the figures depending on how the principles of the disclosure are used in practical applications.

DETAILED DESCRIPTION OF THE INVENTION

For the purposes of promoting an understanding of the principles of the disclosure, reference will now be made to the embodiments illustrated in the figures, and specific language will be used to describe the same. It will nevertheless be understood that no limitation of the scope of the disclosure is thereby intended, such alterations and further modifications in the principles of the disclosure, and such further applications of the principles of the disclosure as illustrated therein being contemplated as would normally occur to one skilled in the art to which the disclosure relates.

The present disclosure describes a battery enclosure solution designed for the safe transportation of lithium-ion batteries 100 (FIG. 1) that allows risk mitigation during battery transportation of potential safety hazards associated with a thermal runaway event in lithium-ion batteries. This includes the mitigation of risk in battery combustion and the emission of toxic gases. The solution benefits both the military and commercial markets requiring safe transport of high energy density, albeit flammable and explosive, lithium-ion batteries.

In this description, key embodiments of the invention disclosure are described in the context of a solution for a "man-portable enclosure" to transport lithium-ion batteries. The term "man-portable" explains the state of the equipment that is light enough so that the equipment can be carried by a person. This term is often used in military applications. However, the use of this term is not meant to be gender-restrictive, and those skilled in the art will recognize the concepts of this disclosure described to be compatible with the term "man-portable" and similar concepts are applicable to the safe transportation of lithium-ion batteries by ground, sea, and air transportation, amongst others.

Figure 1:
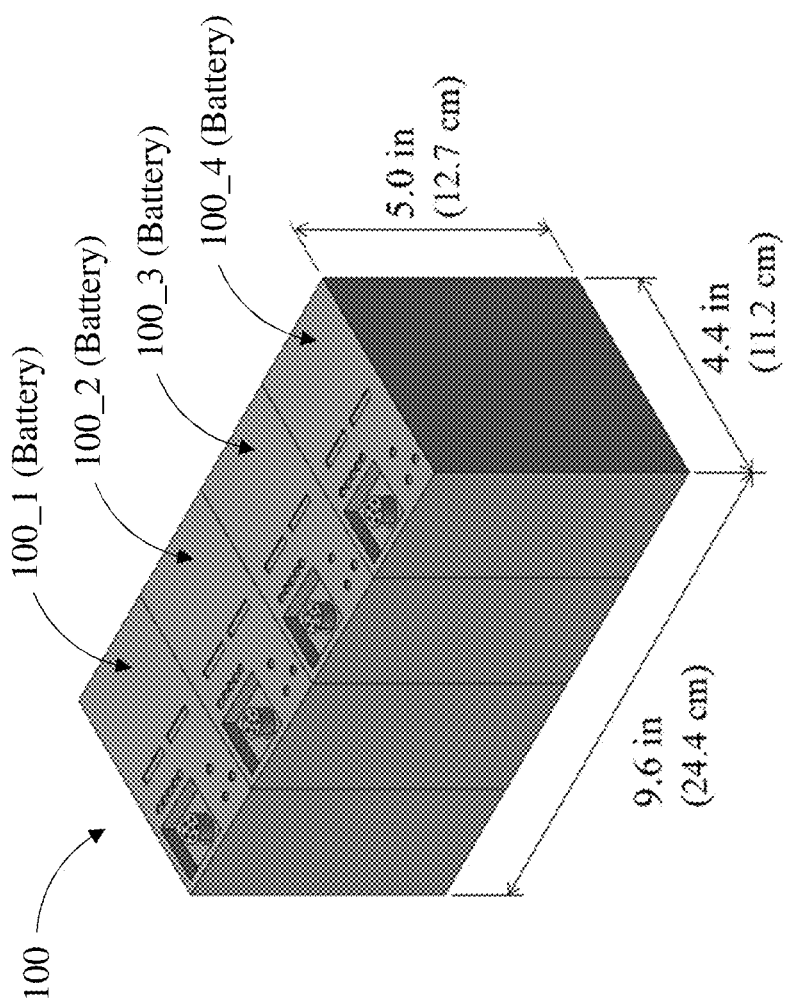
FIG. 1 shows a CAD Sketch of four Lithium-ion batteries (i.e., BB-2590, Bren-Tronics BT-70791CG).

The designs of this disclosure incorporate housing and transportation of four lithium-ion batteries 100_1, 100_2, 100_3, 100_4 (FIG. 1). FIG. 1 shows four batteries merely as an example. The actual number of batteries in a given embodiment or application can be more than four or less than four depending on how the concepts of this disclosure are utilized, and the enclosure of this disclosure retains the attribute of being "man-portable." It should also be recognized that one can include as many batteries as conveniently possible in a given situation if the "man-portable" restriction is eliminated. The dimensions of the battery visual in FIG. 1 are based on the design of the four BB-2590 batteries from Bren-Tronics ["BT-70791CG, BB-2590/U, 9.9 Ah High Performance Rechargeable Lithium-Ion Battery." https://www.bren-tronics.com] that are placed side-by-side. The nominal voltage of each battery is 28.8 V. This implies that each battery comprises eight battery cells if the nominal voltage of each cell is 3.6 V. Thus, using four lithium-ion batteries (BB-2590), one is essentially dealing with a 32-cell battery pack. Furthermore, the weight of each battery is 3.1 lb (1.4 kg); thus, the total weight of the battery pack with four batteries is ~12.4 lb (5.6 kg). This conforms to the definition of "man portable" per NSWC-CD ["Lithium Battery Man Portable Hazard Containment Challenge." https://www.challenge.gov/challenge/lithium-battery-man-portable-containment] where individual soldiers are envisioned to carry up to 12.5 lb (5.7 kg) of battery equipment out of 50 lb (22.7 kg) of total "man portable" weight. Based on this observation, the batteries account for 25% of the total transported individual weight. It should be recognized that the above description is meant to be exemplary and non-limiting. Those of skill in the art will recognize that FIG. 1 can be adopted to suit the individual circumstances.

The term "lithium-ion" indicated herein is to be understood as non-limiting and exemplary as the term was used in the aforementioned NSWC-CD ["Lithium Battery Man Portable Hazard Containment Challenge." https://www.challenge.govichallenge/lithium-battery-man-portable-containment]. Other battery types, including, but not limited to "lithium-metal" batteries, are also possible within the concept of this disclosure. Depending on the type of battery, the fire extinguishing fluids (to be described later) are to be selected.

There are several main objectives of the enclosure design solution of this disclosure: a) the design must be able to contain large particulates—(i.e., of size 5 μm or larger), which can arise from potential disintegrations of the internal components, such as battery electrodes, and extinguish a fire during a thermal runaway event; b) the design must be able to reduce the combustibility or toxicity of released gases from battery casings; c) the design must be stackable with attachment points for transportation (i.e., straps, handles, and/or tie-down) while also securely preventing the movement of batteries inside the carrier. Moreover, the enclosure must provide shock and vibration isolation as well as water and moisture protection for the batteries inside. The boundary dimensions of the proposed design must be within 36 in (91 cm) in circumference and 11.5 in (29 cm) in radius. Based on this constraint for the specified circumference (36 in or 91 cm) and taking into account the outer combined length of the four batteries placed side-by-side (i.e., 28 in=9.6*2+4.4*2 or 71.1 cm) as shown in FIG. 1, these dimensional constraints imply that the enclosure hardware can add a maximum of 8 in. (20.3 cm) to the outside perimeter. The dimension indicated here with reference to FIG. 1 are to be understood as non-limiting and exemplary and are specific to the configuration being discussed with reference to FIG. 1. Other dimensions are possible within the concepts of this disclosure.

Figure 2:
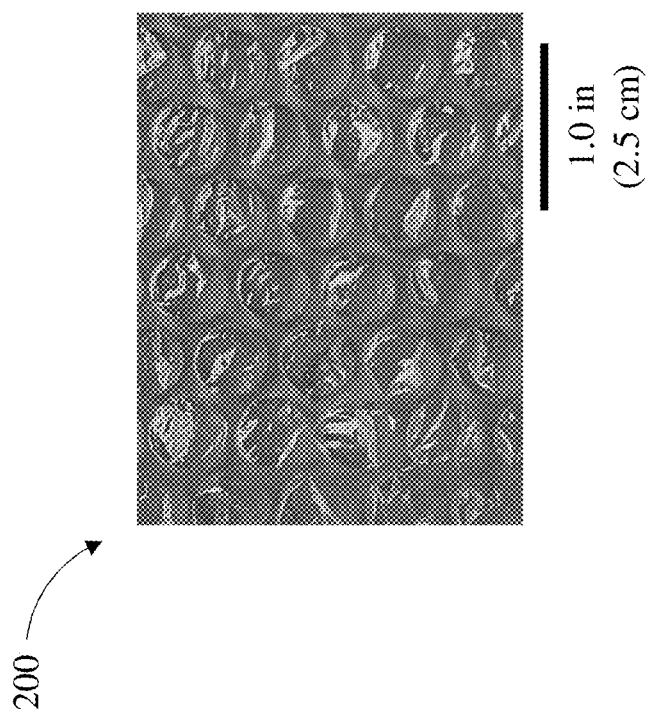
FIG. 2 shows an image of a polymer structure containing pockets capable of encapsulating a fluid.

One of the recent trends in chemistry research is to encapsulate fluids inside polymer structures 200 (FIG. 2). In this disclosure, the term "fluid" may be used to represent both fire-extinguishing liquids and air, either individually or in combination. Some polymer structures that conation pockets having the capability to encapsulate fluids are called "bubbles" structures or "bubble wraps." These polymer structures are made of lightweight and durable thermoplastic, such as polyethylene. The polymer structures of this disclosure contain pockets capable of encapsulating a fluid. The base dimension of a pocket employed in the embodiments of this disclosure may be anywhere between 0.25 and 1.0 in. Most commonly, the polymer pockets have a shape of a hemisphere or nearly hemisphere (e.g., a truncated hemisphere). In such a case, the base dimension is the diameter of the sphere corresponding to the hemisphere or the largest straight-line distance between two points on the surface of the truncated hemisphere. Other shapes of pockets are also possible. This is an adaptive use of commonly available products, where a plurality of the pockets in the polymer structure is used as a chemical storage device. [Bwambok et al., "Adaptive Use of Bubble Wrap for Storing Liquid Samples and Performing Analytical Assays," Anal. Chem., vol. 86, no. 15, pp. 7478-7485, July 2014.]. The pockets in the polymer structure are easily filled with chemicals by injecting with syringe arrays and sealed with coating formulations that include solvents and plasticizers such as those commonly used in cosmetic products for nail hardening, which are readily available. In addition, recent advances in fire extinguishing technology for lithium-ion batteries provide convincing evidence that the use of fire extinguishing microcapsules incorporated within the flammable liquid electrolyte was found to be effective in reducing and even suppressing electrolyte ignition [Yim et al., "Self-Extinguishing Lithium Ion Batteries Based on Internally Embedded Fire-Extinguishing Microcapsules with Temperature-Responsiveness," Nano Lett., vol. 15, no. 8, pp. 5059-5067, July 2015.]. In this disclosure, these concepts (i.e., unfilled/air-filled pockets of the polymer structure, fire-extinguishing chemical agent encapsulation inside the pockets of the polymer structure) are exploited to create a self-extinguishing battery enclosure that can also function as a shock and vibration isolation device. It should be recognized that the pockets described above are generally made of the same material as the polymer structure. In special cases, the pockets can be made of material different from the rest of the polymer structure.

Figure 3:
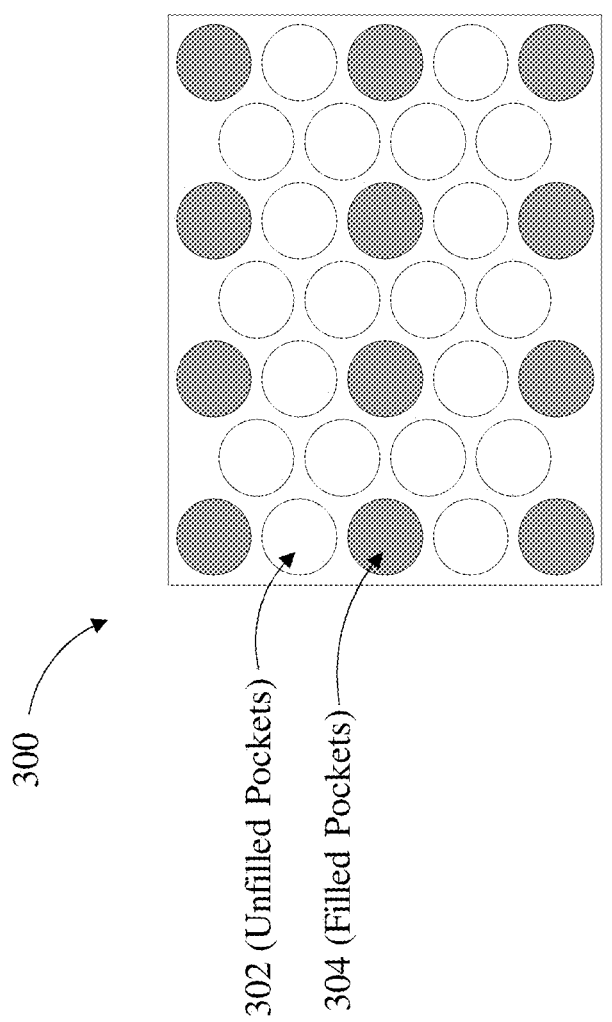
FIG. 3 shows a schematic representation of unfilled and filled pockets in a polymer structure.

A key element of the enclosure of this disclosure for the polymer structures (FIG. 2) is the judicious distribution of pockets filled with lithium-ion fire extinguishing agents and those filled with air, as illustrated in FIG. 3. The goal of this aspect of the design is to provide simultaneous fire-prevention measures and shock and vibration isolation of the enclosed batteries. As a fire extinguishing agent, the enclosure of this disclosure may employ an aqueous vermiculite dispersion (AVD) fire extinguishing agent, wherein the vermiculite particles inside the agents create an oxygen barrier at the source of the lithium-ion battery fire and stop reignition [Wang et al., "The Efficiency of Aqueous Vermiculite Dispersion Fire Extinguishing Agent on Suppressing Three Typical Power Batteries," J. Electrochem. Energy Conyers. Storage, vol. 18, no. 2, May 2021, doi: 10.1115/1.4048368.]. In addition to the AVD fire extinguishing agents for lithium-ion battery fire, OSHA recommends the Class D fire extinguishing agents for fires that involve metals [https://www.osha.gov/sites/default/files/2019-03/fireprotection.pdf]. Since the emerging new type of battery "lithium-metal" (not to be confused with "lithium-ion") uses the lithium-metal anode, instead of the lithium-ion anode, the Class D fire extinguisher may be used with lithium-metal batteries which possess higher energy capacity and gravimetric density than the current standard of lithium-ion batteries. To this end, instead of employing the aforementioned AVD fire extinguishing agents for the current lithium-ion batteries, the enclosure of this disclosure may employ the Class D agents for the transportation of future batteries exploiting lithium-metal batteries. For further information about lithium-metal batteries, please see Placke et al., "Lithium Ion, Lithium Metal, and Alternative Rechargeable Battery Technologies: The Odyssey for High Energy Density," J. Solid State Electrochem., vol. 21, no. 7, pp. 1939-1964, 2017.

Research [Russoa et al., "Effective Fire Extinguishing Systems for Lithium-ion Battery," in Chem. Eng. Trans., 2018, vol. 67, pp. 727-732.] has shown that a water-based fire extinguishing agent is most effective when mitigating the duration of thermal runaway fire from lithium-ion batteries. However, the simple use of water, in this case, is not feasible since it takes very large amounts of water to extinguish a fire from the lithium-ion batteries. The proposed design is meant to be man-portable, which means that the transported object must be as small and light as possible for maximum user portability. Therefore, carrying a large amount of water, for the sole purpose of fire extinguishment, cannot be a part of the design option. This is why the use of AVD fire extinguishing agents is proposed as the lithium-ion battery fire extinguishing agents FIG. 3 depicts polymer structures 300, which is a plurality of pockets, function as shock and vibration isolation devices during the normal (i.e., non-thermal runaway) operation by using the unfilled pockets 302 (FIG. 3) with the air inside. As explained previously for 200 (FIG. 2), these pockets 300 are made of lightweight and durable thermoplastic, such as polyethylene. The base dimension in each of the plurality of the polymer structure may be anywhere between 0.25 in and 1.0 inch. Most commonly, the polymer structure has the shape of a hemisphere or nearly hemisphere, such as a truncated hemisphere. Other shapes of polymer structures may also be possible. In addition to unfilled pockets 302, which has the air inside, there are some filled pockets 304 (FIG. 3) with fire extinguishing agents, for instance, the AVD agents or Class D agents inside. During a thermal runaway event, the high surface temperature of the batteries melts the polymer material for the pockets. As a result, the fire extinguishing agents inside the filled pockets 304 spills onto the battery pack. An innovative aspect of this disclosure is the use of polymer materials whose composition is engineered to adjust their melting points at the battery surface temperature associated with thermal runaway. The filled pockets 304 may be either completely filled or partially filled with fire extinguishing agents. The completely filled pockets are very stiff; thus, they behave like a solid, which does not contribute as shock and vibration isolation devices. On the other hand, the partially-filled pockets are less stiff; thus, these pockets may contribute as shock and vibration isolation devices. Needless to say, the unfilled pockets 302 is the best shock and vibration isolation device. Therefore, both the location of the filled pockets and the percentage filling of fire extinguishing agents inside pockets affect the shock and vibration isolation capabilities of the assembly.

Figure 4:
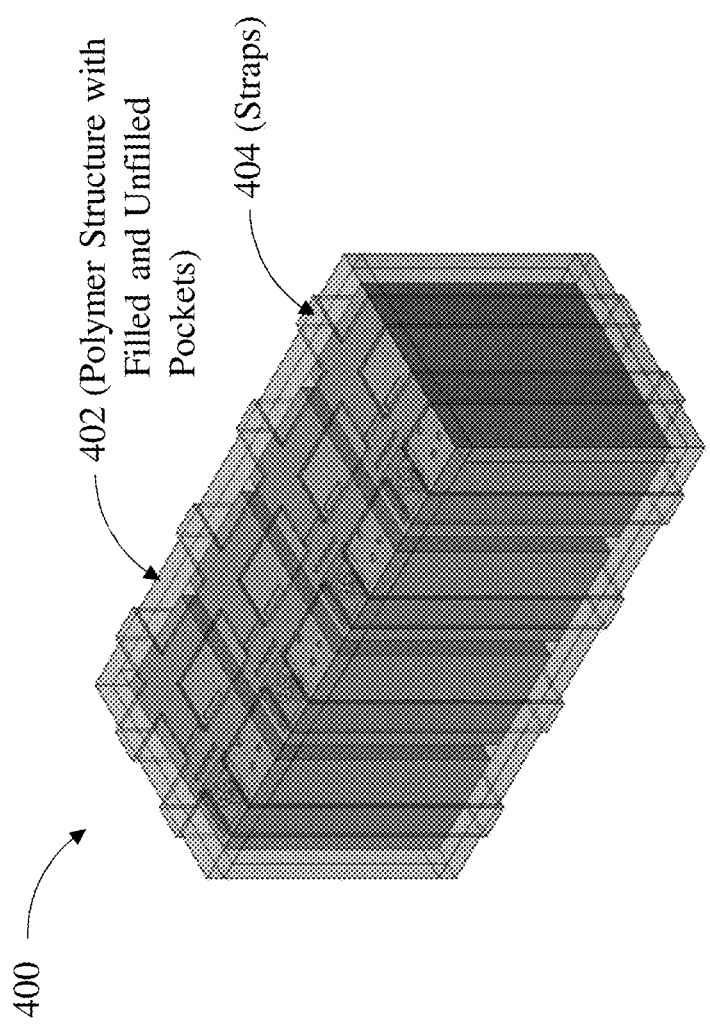
FIG. 4 shows the batteries of this disclosure wrapped in a polymer structure of FIG. 2.

FIG. 4 depicts a conceptual packing 400 of the batteries utilized for transportation, wherein four batteries are wrapped inside a polymer structure 402 (FIG. 4) with filled pockets 304 and unfilled pockets 302. The polymer structure 402 is constrained using straps 404 (FIG. 4). Examples of materials that can be used for the polymer structure 402 were described previously as a part of 200 (FIG. 2), wherein the material must be lightweight and durable thermoplastic, such as polyethylene. The base dimension in each of the plurality of the pockets may be anywhere between 0.25 and 1.0 in. Most commonly, the polymer structure has the shape of a hemisphere or nearly hemisphere, such as a truncated hemisphere. Other shapes of polymer structures may also be possible. Examples of materials that can be used for the straps 404 are lightweight and durable thermoplastic, such as polypropylene with the potential width of 0.25 to 2.0 in and the thickness of 0.002 to 0.004 in.

Figure 5:
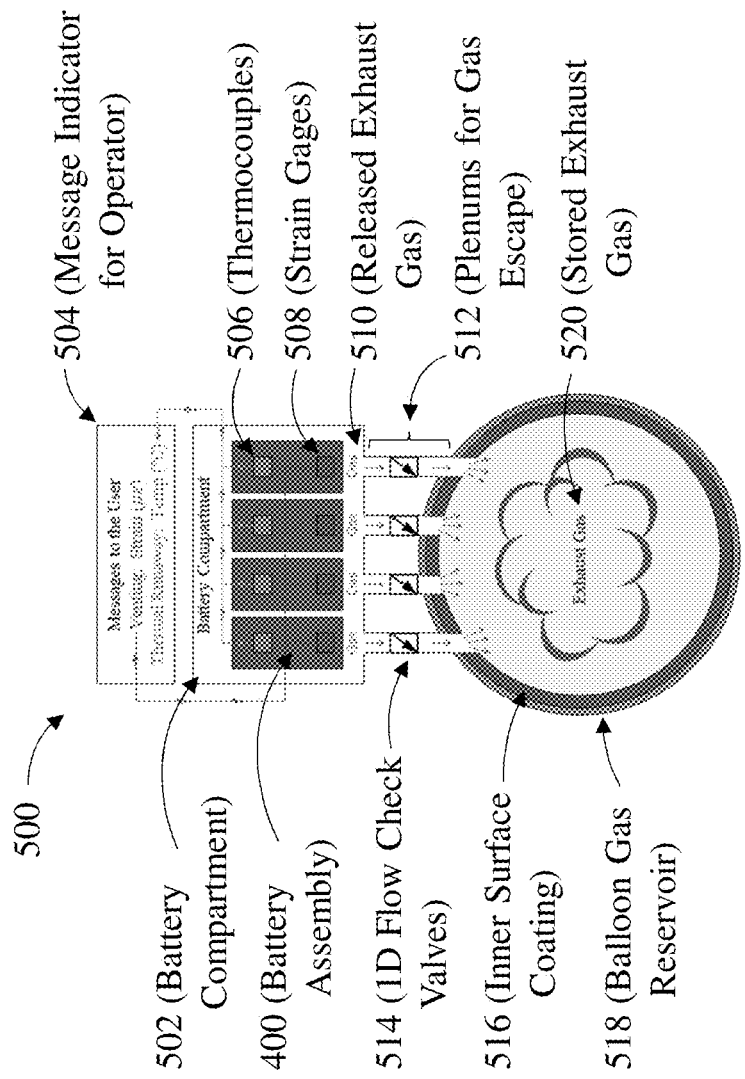
FIG. 5 shows the gas escape mechanism of this disclosure.

FIG. 5 shows transportation vessel 500 utilized for containing battery compartment 502, message indicator 504, thermocouples 506, strain gages 508, released exhaust gas 510, plenums for gas escape 512, 1D flow check valves 514, inner surface coating 516, balloon gas reservoir 518, and stored exhaust gas 520.

Examples of materials that can be used for battery compartment 502 include, but not limited to, high temperature resisting polymers (i.e., thermosets) such as phenolics and epoxy. Since the aforementioned battery packing 400 is placed inside the battery compartment 502 of the transportation vessel 500 (FIG. 5), the battery compartment 502 must be a rectangular shape that conforms to the shape of the packed batteries 400. Examples of materials that can be used for the message indicator 504 include, but not limited to, high temperature resisting polymers (i.e., thermosets) such as phenolics and epoxy.

The thermocouples 506 may be a purchased component from a reputable thermocouple manufacturer (e.g., Omega Engineering Inc., https://www.omega.com/en-us/) that can measure the surface temperature and can conform to the shape of the batteries 400. The potential temperature range is Type "K" which has the temperature range of $-200°$ C. ($-328°$ F.) to $1250°$ C. ($2282°$ F.). The size of the thermocouples may be in a range of 0.25 to 1.0 in. The strain gages 508 may be a purchased component from a reputable strain gage manufacturer (e.g., Vishay Micro-Measurements, https://micro-measurements.com/) that can measure the surface strain and can conform to the shape of the batteries 400. The potential strain range is 0 to 1,000 micro-strain. The size of the strain gages may be in a range of 0.125 to 0.5 in.

The released exhaust gas 510 and stored exhaust gas 520 are the exhaust gases that escape from the battery cells during the thermal runaway event. The released exhaust gas 508 contains a large amount of hydrogen fluoride (HF) [Larsson et al. "Toxic Fluoride Gas Emissions from Lithium-Ion Battery Fires," Sci. Rep., vol. 7, no. 1, pp. 1-13, December 2017, doi: 10.1038/s41598-017-09784-z.], whereas the stored exhaust gas 520 does not contain a large amount of HF since the gas has been neutralized with the inner surface coating 516. The inner surface coating 516 has the activated alumina and potassium permanganate that are effective in gettering HF and other poisonous gases released during a thermal runaway event [Nedjalkov et al., "Toxic Gas Emissions from Damaged Lithium-ion Batteries—Analysis and Safety Enhancement Solution," Batteries, vol. 2, no. 1, p. 5, March 2016.]

The plenums for gas escape 512 are escape passages for the exhaust gas released from the batteries. Examples of materials that can be used for the plenums 512 include, but not limited to, high temperature resisting polymers (i.e., thermosets) such as phenolics and epoxy. The cross-section of the plenums 512 may be a circular or rectangular hollow cross-section that enables the transportation of the exhaust gas. The inner diameter of each of the plenums may be 0.25 to 1 in. The plenums for gas escape 512 houses 1D flow check valves 514 in the path of the exhaust gas to prevent the reverse flow of the gas. Examples of materials that can be used for the 1D flow check valves 514 include, but not limited to, high temperature resisting polymers (i.e., thermosets) such as phenolics and epoxy or metals such as stainless steel and bronze. The outer dimension of the 1D flow check valves must fit inside the plenums; thus, the outer dimension of the 1D flow check valves must be between 0.25 to 1 in. The plenums 512 are connected to the balloon gas reservoir 518. Examples of materials that can be used for the balloon gas reservoir 518 include, but not limited to, high temperature resisting Nylon or Kevlar. Since these materials do not expand easily like a rubber, the Nylon or Kevlar materials will be folded inside the enclosure like a folded parachute. Then, upon the gas entrance, the reservoir 518 will unfold and balloons out. The outer dimension of the balloon gas reservoir 518, when expanded, may be between 48 to 96 in. While the balloon gas reservoir is expanding its volume, the user acknowledges the occurrence of the gas release based on the thermal runaway event so that the user can safely place the man-portable system away from the user. Effectively, the expansion of the balloon gas reservoir is the last warning sign for the user that the battery is experiencing a thermal runaway.

During transportation, the temperature and cell expansion will be continuously monitored by placing on the battery outer surfaces thermocouples 506 and strain gages 508 (FIG. 5). The strain gage (i.e., a deformation sensor) signal output will be used to provide a warning message via the message indicator 504, wherein a venting event is approaching and/or that a venting event has just taken place. Similarly, by using the thermocouple (i.e., a temperature sensor) signal output, a warning message on the indicator 504 will provide the user with a message that a thermal runaway event is approaching and/or that a thermal runaway event has just taken place.

After the venting event occurred, the released toxic gases 510 will be guided through the vent plenums 512 with 1-D flow check valves 514 so that the released toxic gas 510 will flow into a balloon gas reservoir 518. Since the gas goes through the 1-D flow check valves 514, the gas never flows back in the reverse direction. As a result, the expandable balloon gas reservoir 518 stores the released gas 520. To mitigate the risk of injury from the toxic gas release, the enclosure of this disclosure incorporates filtration cartridges based on a design available in the literature prior to exhausting into the balloon gas reservoir. Furthermore, the stored exhaust gas 520 inside the balloon gas reservoir 518 can be neutralized by the inner surface coating 516 with activated alumina and potassium permanganate. These two materials described in the literature are effective in gettering hydrogen fluoride (HF) and other poisonous gases released during a thermal runaway event [Nedjalkov et al., "Toxic Gas Emissions from Damaged Lithium-ion Batteries—Analysis and Safety Enhancement Solution," Batteries, vol. 2, no. 1, p. 5, March 2016.].

Figures 6A, 6B:
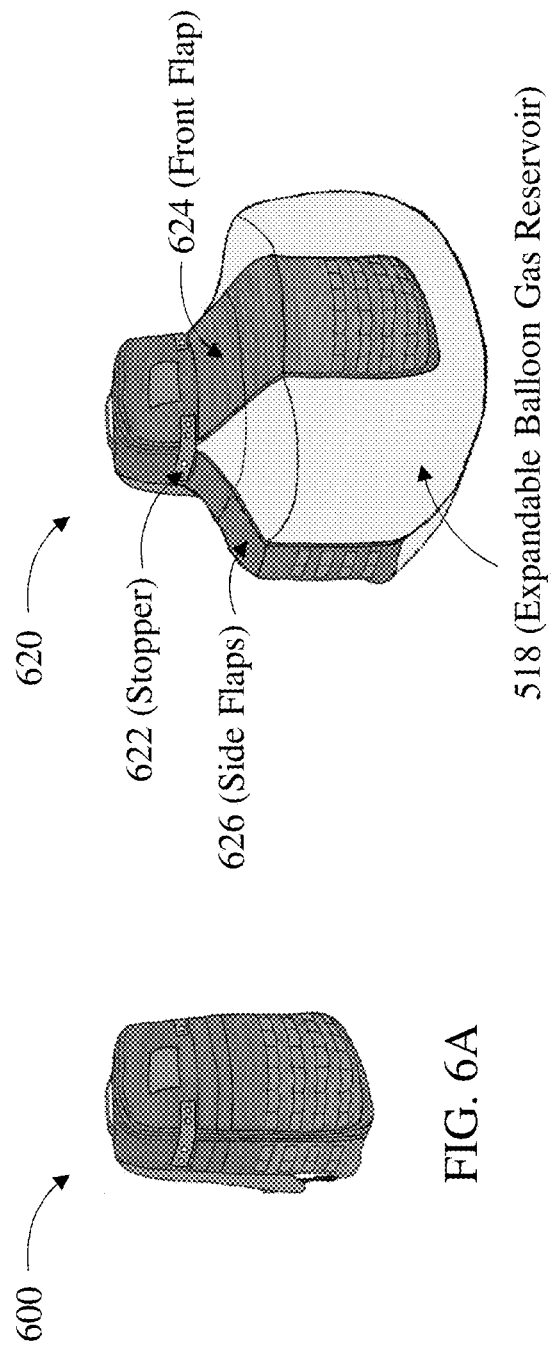
FIG. 6A shows a conceptual sketch of the outside of the enclosure of this disclosure before the occurrence of the thermal runaway event.
FIG. 6B shows a conceptual sketch of the outside of the enclosure of this disclosure after the occurrence of the thermal runaway event.

The transportation vessel 500 (FIG. 5) is placed inside a specially designed rucksack/backpack 600 (FIG. 6). FIG. 6A and FIG. 6B depict the conceptual sketch of the proposed rucksack/backpack design utilized for containing expandable balloon gas reservoir 518 and is made up of front flap 624, side flaps 626, and stopper 622. The rucksack/backpack, for the purpose of this disclosure, is a bag that allows a person to carry the man-portable battery system inside. Examples of materials that can be used for the front flap 624, side flaps 626, and stopper 622 include, but not limited to, high temperature resisting Nylon and Kevlar. The outer dimension of the rucksack/backpack may be between 18 and 24 in for the height, 12 to 15 in for the width, and 8-15 in for the depth. As described under 518, the outer dimension of the balloon gas reservoir, when expanded, may be between 48 and 96 in.

Referring to FIG. 6A, 600 depicts the state of rucksack/backpack before the occurrence of the thermal runaway. Referring to FIG. 6B, 620 depicts the state of rucksack/backpack after the occurrence of the thermal runaway event with the inflation of the expandable balloon gas reservoir 518. The expandable balloon reservoir is placed inside the rucksack/backpack that allows the expansion of the reservoir by using the separable front flap 624 and side flaps 626. The stopper 622 prevents the excessive separation between the front flap 624 and the side flaps 626 in order to maintain the structural integrity of the rucksack/backpack immediately after the occurrence of the thermal runaway event.

The Self-Extinguishing, Toxic Gases Containment Enclosure of this disclosure for Lithium-Ion Batteries focuses on two major factors: (1) Management and containment of released toxic gases (i.e., gas venting, plenum passage to the balloon gas reservoir, storing of gas in the tank, and neutralization of toxic gas inside the tank) and (2) Mitigation of the risk associated with the thermal runaway fire.

For the management of released gases (i.e., venting and gas escape through the plenum passage), the vent design of the battery pack is important. Specifically, the exhaust gas outlet location of the battery (e.g., BB-2590) is the critical design parameter assuming that the battery has a built-in pressure relief mechanism. Therefore, knowing the precise location of the build-in pressure relief mechanism on the battery allows the creation of vent plenums on that location inside the battery compartment. Furthermore, the intended vent pressure (e.g., p=1.2 bar) of the battery is to be satisfied. By knowing the vent pressure value as well as the relationship between the internal pressure (MPa) and strain ($\mu\epsilon$) of the external casing, one can predict: a) when the venting event is approaching and b) when the venting event takes place based on the strain gage readings. For storage of the exhaust gases in the tank, we consider an expandable balloon gas reservoir 518 (FIG. 5 and FIG. 6B). Neutralization of toxic gas has been described above.

For the mitigation of the thermal runaway fire, the onset of thermal runaway temperature can be 180° C. and 80° C. in undercharged and overcharged states, respectively. The onset of thermal runaway temperature also depends on the insertion rate of a nail in the case of nail penetration. The specific temperature for the onset of thermal runaway depends on many factors (e.g., state of charge and chemistry), especially inside the battery cells; however, the onset of the thermal runaway temperature outside the battery cell is defined as approximately 90° C. To provide a warning that the battery will undergo thermal runaway based on the thermocouple signal, a specific temperature is needed at a specific loading case (e.g., thermal, electric, and mechanical) associated with the thermal runaway event. Thus, to precisely predict and detect the thermal runaway in our battery, more specifics on the thermal runaway characteristics of the subject battery (e.g., BB-2590) are required. It is also important to avoid the mis-triggering of the warning sign to the user of the man-portable system.

The following is a summary of the steps in the operation of battery that leads to the deployment of the proposed system: 1) battery temperature reaches a pre-set thermal runaway temperature due to faulty operations, such as, but not limited to, an internal or external short circuit, battery overcharge, or excessive rate of charge or discharge; 2) temperature signals from the thermocouples are transmitted to the message indicator and notify the user of the high battery temperature; 3) an excessive gas is generated inside the battery cells and expand the volume of the battery cells; 4) a strain gage signals from the strain gages are transmitted to the message indicator and notify the user of the excessive battery deformation; 5) the gas vent opens due to the high internal pressure in the battery cells; 6) battery thermal runaway (i.e., fire and gas release) starts; 7) the exhaust gas flows into the plenums, 8) the exhaust gas flows through the 1D flow check valves; 9) the exhaust gas flows into the balloon gas reservoir; 10) the inner surface coating of the reservoir neutralizes the HF toxic gas; 11) the high temperature caused the polymer material of the pockets to melt; 11) the fire extinguishing agents to flow into the battery cells to put out the fire.

Based on the above detailed description, it is an objective of this disclosure to describe an enclosure for safe transportation and storage of a battery or a collection of batteries. The enclosure contains a plurality of batteries held together by a polymer structure, wherein the polymer structure contains pockets capable of encapsulating at least one fire extinguishing fluid. The enclosure also contains a plurality of sensors deployed on the surface of each battery in the plurality of batteries, wherein the sensors are capable of monitoring surface temperature and volume expansion of each battery in the enclosure and providing signal output; corresponding to the temperature and volume expansion of the batteries. The enclosure further contains a toxic gas release management and containment system. In some embodiments of the enclosure of this disclosure, a fraction of the pockets are filled with at least one fire-extinguishing chemical. In operation, the polymer structure of the enclosure is capable of melting to release at least one fire-extinguishing fluid encapsulated in the fraction of the pockets at a pre-set temperature. It should be recognized that not all pockets need to be filled with the fire extinguishing fluid. If no pockets are filled with the fire extinguishing fluid (i.e., all pockets are filled with air only, which we call "unfilled pockets"), the pockets provide only shock and vibration isolation for the batteries contained in the enclosure; thus, no fire extinguishing can be accomplished. On the other hand, if all pockets are filled with at least one fire-extinguish fluid, the filled pockets are very stiff. As a result, these pockets behave like a solid, thereby not contributing to the battery system as shock and vibration isolation devices. In some embodiment of the enclosure of this disclosure, the fraction of the pockets filled with a fire extinguish fluid is between 0.1 and 0.9. Further, the location of the pockets filled (i.e., the spatial distribution of the filled pockets and the unfilled pockets in the polymer structure) can have an impact on the shock and vibration isolation capability of the enclosure. Thus, the spatial distribution of the fraction of pockets filled with at least one fire-extinguishing fluid, is varied based on predetermined shock absorption characteristics of the enclosure such that optimum shock absorption is provided. In some embodiments of the enclosure of the disclosure, at least one of the plurality of sensors is deployed on the battery surface to provide continuous monitoring of battery surface temperature of the battery. In some embodiments of the enclosure of the disclosure, at least one of the plurality of sensors is deployed on the battery surface to provide continuous monitoring of battery surface deformation. It should be recognized that in some embodiments of the enclosure of this disclosure, the plurality of sensors is capable of conforming to the shape and size of batteries in the enclosure. Such conformance can be achieved by deploying flexible materials in the construction of the sensors. The field of flexible electronics is a great aid in accomplishing the conformance required. In some embodiments of the enclosure, the signal output of the plurality of the sensors is continuously relayed to a carrier of the enclosure and to a command center monitoring transportation of battery devices using a wired or wireless communication system. In some embodiments of the enclosure, the toxic gas management and containment system comprise venting plenums, filtration cartridges deployed next to the plenum valves, and a balloon gas reservoir capable of neutralizing toxic gases received by the gas reservoir. In some embodiments of the enclosure of this disclosure, the venting plenums comprise 1-D flow valves to guide the released gases into the balloon gas reservoir to prevent the reverse flow of the gases released from the batteries. In some embodiments of this disclosure, the inner surface of the balloon gas reservoir is coated with activated alumina and potassium permanganate. Such coatings may include materials capable of gettering toxic hydrogen fluoride released in battery thermal runway events. In some embodiments of the disclosure, the toxic gas management and containment system comprise an expandable balloon, which is fully enclosed in its deflated state within the enclosure.

Several references have been cited in describing the present invention in this disclosure. The contents of these cited references are hereby incorporated by reference in their entirety into the present disclosure to the extent permissible by law.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible.

The invention claimed is:

1. An enclosure for safe transportation and storage of a battery or a collection of batteries, the enclosure comprising:
    A plurality of batteries held together by a polymer structure, wherein the polymer structure comprises pockets capable of encapsulating at least one fire extinguishing fluid;
    a plurality of thermocouples and a plurality of strain gages deployed on a surface of each battery in the plurality of batteries, wherein the plurality of thermocouples monitor surface temperature of each battery which is interfaced with one or more the plurality of the thermocouples, and the plurality of strain gages monitor volume expansion of each battery which is interfaced with one or more of the plurality of strain gages; and
    a toxic gas release management and containment system.

2. The enclosure of claim 1, wherein a fraction of the pockets are filled with air or at least one fire-extinguishing chemical.

3. The enclosure of claim 2, wherein the polymer structure is capable of melting to release at least one fire-extinguishing fluid encapsulated in the fraction of the pockets at a pre-set temperature.

4. The enclosure of claim 2, wherein spatial distribution of the fraction of pockets filled with air or at least one fire-extinguishing fluid is varied based on predetermined shock absorption characteristics of the enclosure.

5. The enclosure of claim 1, wherein at least one of the plurality of sensors is deployed on the battery surface to provide continuous monitoring of battery surface temperature of the battery.

6. The enclosure of claim 1, wherein at least one of the plurality of sensors is deployed on the battery surface to provide continuous monitoring of battery surface deformation.

7. The enclosure of claim 1, wherein the plurality of sensors is capable of conforming to the shape and size of batteries in the enclosure.

8. The enclosure of claim 1, wherein the signal output of the plurality of the sensors is continuously relayed to a carrier of the enclosure and to a command center monitoring state of the transported battery cells using a wired or wireless communication system.

9. The enclosure of claim 1, wherein the toxic gas management and containment system comprises venting plenums, filtration cartridges deployed next to the plenum valves, and a balloon gas reservoir capable of neutralizing toxic gases received by the gas reservoir.

10. The enclosure of claim 9, wherein the venting plenums comprise 1-D flow valves to guide the released gases into the balloon gas reservoir to prevent the reverse flow of the gases released from the batteries.

11. The enclosure of claim 9, wherein the inner surface of the balloon gas reservoir is coated with activated alumina and potassium permanganate.

12. The enclosure of claim 1, wherein the toxic gas management and containment system comprises an expandable balloon, which is fully enclosed in its deflated state within the enclosure.

* * * * *